Dec. 24, 1957  J. H. W. JOHANNSEN  2,817,376
PRESSURE AND SAFETY DEVICE FOR CIRCULAR SAWS AND THE LIKE
Filed July 11, 1955  2 Sheets-Sheet 1
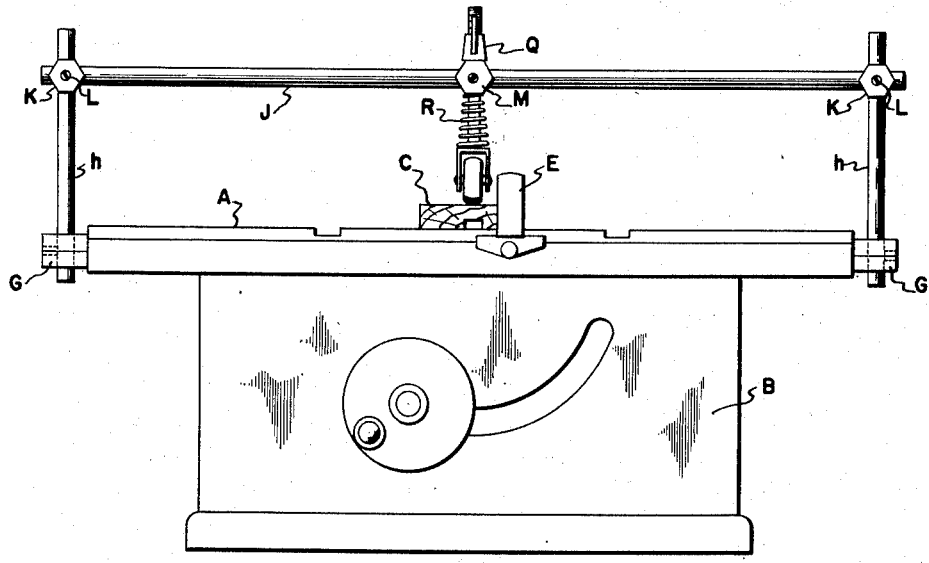
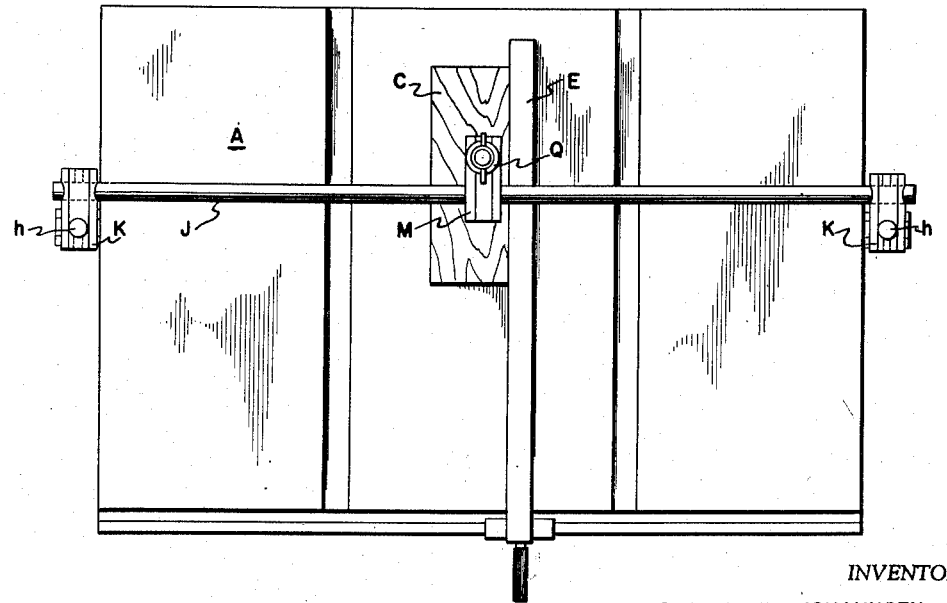
INVENTOR
JOHN H. W. JOHANNSEN
BY *Ralph L. Bassett*
ATTORNEY Dec. 24, 1957  J. H. W. JOHANNSEN  2,817,376
PRESSURE AND SAFETY DEVICE FOR CIRCULAR SAWS AND THE LIKE
Filed July 11, 1955  2 Sheets-Sheet 2
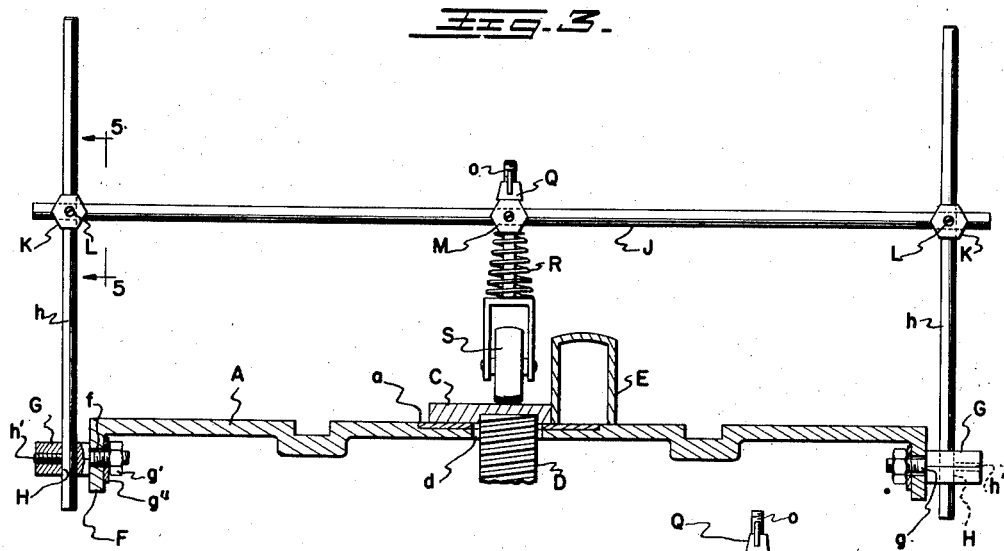
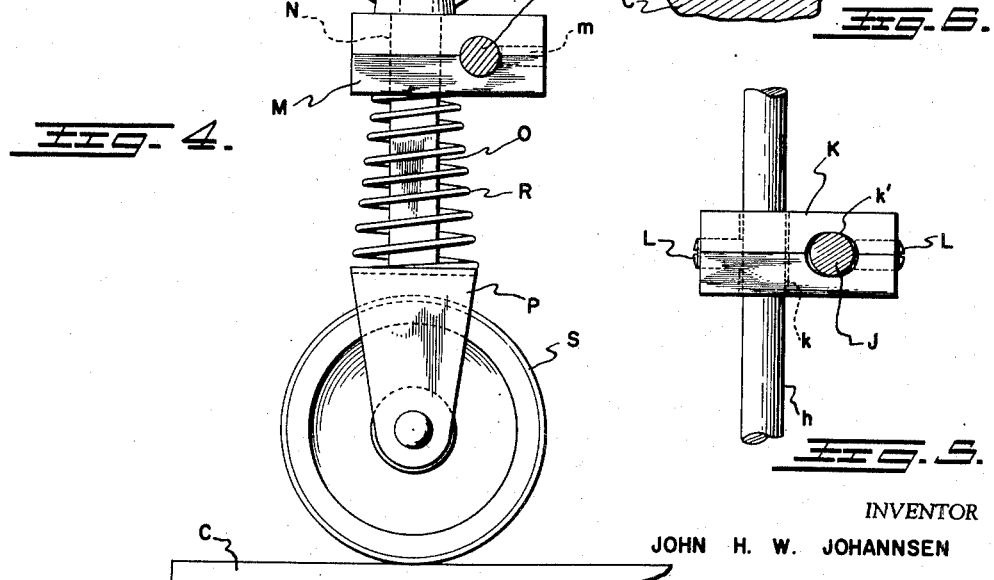
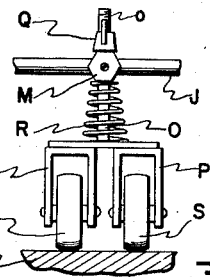
INVENTOR
JOHN H. W. JOHANNSEN
BY *Ralph L. Bassett*
ATTORNEY

United States Patent Office 2,817,376
Patented Dec. 24, 1957

2,817,376

PRESSURE AND SAFETY DEVICE FOR CIRCULAR SAWS AND THE LIKE

John H. W. Johannsen, Wauwatosa, Wis.

Application July 11, 1955, Serial No. 520,985

6 Claims. (Cl. 144—249)

This invention relates to hold-down devices for work and is used on such devices as circular saws, milling, grooving, nosing, tonguing and dadoing mechanism.

One of the objects of the invention is to provide a hold-down device which will also function as a guard to the user and which is capable for use in home workshops and the like and particularly in connection with tools, including tilting tables.

Another object of the invention is to provide such a hold-down device which can be used in combination with a tilting drive axle, the table being stationary, by quick and easy adjustment of the device to the angle-tilt of the drive axle.

A further object of the invention is to provide a hold-down device which will also function as a guard and which can be readily attached to the heavier home shop machinery and particularly machinery using circular cutters.

A further object of the invention is to provide a hold-down device which may be readily applied to conventional heavy home shop machinery using rotary cutters, the device being such that it can be readily attached to such shop machinery and when so attached, quickly and easily adjusted to accomplish its intended functions.

Other features will more clearly hereinafter appear by reference to the accompanying drawings forming a part of the instant specification and wherein like characters of reference designate corresponding parts throughout the several views, in which:

Fig. 1 is an end elevation of a machine showing the device in working position;

Fig. 2 is a top plan view of Fig. 1;

Fig. 3 is a transverse section through a machine showing the connecting means for attaching the device in position;

Fig. 4 is an enlarged detail view of the hold-down element;

Fig. 5 is an enlarged elevation of one of the adjustable supports; and

Fig. 6 shows a modified form of pressure roll.

In Figs. 1 and 2 a conventional table is illustrated by reference character A, this table having a suitable supporting base B. In the disclosure the work is indicated at C, being held in position by the instant invention for working association with a rotary cutter D which may be a grooving cutter (Fig. 3), a saw, or any similar driven working element which is functioning on the lower surface of the work piece C to form a longitudinal groove therein as the work travels over the cutter. The table A is provided with a medial opening $d$ and the upper surface of the table is provided with the usual insert $a$ to reinforce the area adjacent the cutter opening. A suitable guide or fence E is illustrated, this guide normally abutting one longitudinal edge of the work piece C to retain the same in proper direction of travel with respect to the cutting element.

The table A will be of any standard construction and will include the side depending flanges F (Fig. 3), these flanges being formed with transversely aligned openings $f$ for receiving the shanks of the studs G, the shanks being indicated by reference character $g$ and being threaded to receive the nuts $g'$ which are locked into position by lock washers $g^2$ which clamp the relatively large angular bodies of the studs G against the outer faces of the flanges F. These studs G are capable of being rotated to any degree to provide for angular adjustment of the pressure roll supporting mechanism. The large stud body G is formed with a normally vertical oval opening H for receiving the vertical standards or rods $h$, the latter being secured in position by set screws $h'$. The transverse openings $f$ are positioned in the plane of the axis of the cutter D so that pressure will be applied to the work C in the most efficient manner. A supporting cross rod J is adjustably secured to the vertical supporting rods $h$ by clamps or sliding connectors shown in Fig. 5, these clamps or sliding connectors include bodies K formed with longitudinally spaced transverse openings $k$ and $k'$ extending through the connector structure at 90° for the reception of the upright rods $h$ and the vertically adjustable horizontal pressure roll supporting rod J. Set screws L extend lengthwise from each end of the connector for engaging the rods J and $h$ to lock them in their relative adjusted position in the passageways $k$ and $k'$.

Supported medially of the horizontal rods J is an additional sliding connector M of the same type as used at the junction of the frame but with a single set screw $m$, this set screw being used to secure the connector M in locked transverse position on the rod J. The normally vertical opening N in this connector M is of larger diameter to receive the post O supporting the wheel bracket P, the upper end of the post O being reduced and threaded at $o$ to receive the thumb nut Q for clamping the structure against tension of the pressure spring R which is of tapered spiral type and abuts the top of the wheel bracket P and the bottom of the connector M so that by setting the thumb nut Q, the tension of the spring may be adjusted to vary the tension of the pressure wheel S which works directly upon the top of the work piece C to retain the same against the pressure of the cutter D upon the work table top. In Fig. 6 a pair of pressure rolls are supported in a dual bracket structure. This arrangement may be modified by a tandem arrangement of pressure rolls.

Thus, it will be seen that the circular cutter or saw D operating through the slot $d$ in the table top is operating upon the work C held into position by predetermined pressure applied through the spring R and the amount of tension which may be applied to the spring may be further modified by adjusting the elevation of the supporting horizontal rod J with respect to the plane of the table A. Under certain conditions the pressure or roller wheel S may be required to be shifted with respect to the guide E and/or with respect to the cutter D and this can be accomplished by loosening the set screw $m$ and sliding the connector M laterally in either direction on the rod J. The present invention eliminates the necessity for the operator to come into a position close to the working cutter and thus insures against injury to the operator's hands. It will not be necessary for the operator to use his hands to hold-down the work on the table, but leaves the operator free to use his hands in feeding the work through the machine. It will be obvious that any number of these pressure assemblies may be mounted on the horizontal bar J, depending upon the type or types of cutter or cutters being used and the width of the work upon which the cutters may be working. By having the supporting structure generally in the plane of the axis of the working cutter D, it will be obvious that the relatively large pressure wheel S will generally approximate the spread of the cutter area projecting through the slot in the table.

What I claim is:

1. In combination with a work table, a support therefor, said work table having depending aligned sidewall portions, axially aligned openings formed in the sidewall portions, studs extending through said openings and secured to the sidewall portions, said studs being formed with vertical passages, vertically adjustable upright rods extending into the passages and fixed to said studs, sliding connectors carried by said upright rods, said connectors including bodies formed with horizontal openings, a horizontal cross rod supported by said sliding connectors, a sliding connector mounted on said horizontal cross rod for adjustment therealong, said connector having a vertical opening therein, a pressure wheel and a wheel bracket, a post having a threaded shank supporting said bracket and wheel, said post extending through the opening in the last-named connector, a spring mounted on said post between said bracket and said last-named connector, and means for adjusting the tension of said spring including a thumb nut operating on the threaded shank of said post.

2. In combination with a work table, a support therefor, upright rods fixed to the opposite side portions of said table for vertical adjustment, a horizontal cross rod, a connection element slidably mounted at each end portion of the cross rod, each connection element being formed with a vertical opening for slidably receiving the upper end portions of said upright rods, means for fixedly securing said connection elements to said upright rods and said cross rods, a slidable connection mounted on said horizontal cross rod intermediate the connectors on the end portions thereof, said last-named connection having a vertical opening formed therein, a pressure wheel assembly carried on said intermediate connector, said pressure wheel including a wheel and wheel bracket mounted at the end of a post, said post extending through said vertical opening in said intermediate connection for sliding movement therethrough and having a threaded upper extremity, a spring between the wheel bracket and the post, and a thumb nut threaded on the threaded end portion of said post for adjusting the tension of said spring.

3. In combination with a work table and a support therefor, said work table having side wall portions formed with axially aligned openings, studs extending through said openings, means for securing said studs in fixed adjusted position, said studs being formed with transverse openings and normally fixed so said openings are vertical, vertically adjustable upright rods extending through the openings, means for securing said rods in adjusted position, sliding connectors carried by said upright rods, said connectors being formed with horizontal openings, a horizontal cross rod extending through said openings, said horizontal cross rod being supported for longitudinal and rotational adjustment, means for securing said rod in fixed adjusted position, a connector slidably mounted on said horizontal cross rod for longitudinal and rotational adjustment, said last-named connector having a vertical opening therein, a pressure wheel and a wheel bracket, post having a threaded shank supported by said bracket, said post extending through the opening in the last-named connector, a spring mounted on the post between the bracket and the last-named connector, and means for adjusting the tension of the spring and thereby regulating the pressure applied by the pressure wheel.

4. The structure of claim 2 characterized in that the vertical opening formed in the connector slidably mounted on the horizontal cross rod is angular in cross-section and the post extending through said opening is of similar cross-section.

5. The structure of claim 2 characterized in that a plurality of pressure wheels are supported by the post.

6. The structure of claim 2 characterized in that the direction of the pressure wheels can be modified by relative adjustment of the supporting structure, regardless of the position of the work table.

References Cited in the file of this patent

UNITED STATES PATENTS

| 285,407 | Gretschel | Sept. 25, 1883 |
| 1,542,097 | Ripley | June 16, 1925 |
| 1,616,478 | Watson | Feb. 8, 1927 |
| 1,702,185 | Weber | Feb. 12, 1929 |
| 1,744,875 | Edwards | Jan. 28, 1930 |
| 1,993,219 | Merrigan | Mar. 5, 1935 |